United States Patent
Cook et al.

(10) Patent No.: US 6,691,161 B1
(45) Date of Patent: Feb. 10, 2004

(54) PROGRAM METHOD AND APPARATUS PROVIDING ELEMENTS FOR INTERROGATING DEVICES IN A NETWORK

(75) Inventors: Mark Douglas Cook, St Albans (GB); Simon Peter Valentine, Hemel Hempstead (GB); Paul Robert Jones, Luton (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/444,554

(22) Filed: Nov. 22, 1999

(30) Foreign Application Priority Data

May 11, 1999 (GB) .............................................. 9910962
Jul. 13, 1999 (GB) .............................................. 9916426

(51) Int. Cl.[7] .............................................. G06F 15/177
(52) U.S. Cl. ...................................... 709/223; 709/220
(58) Field of Search .............................. 709/223, 203, 709/331, 315, 220, 327, 221, 104, 226; 710/3

(56) References Cited

U.S. PATENT DOCUMENTS

| | | | |
|---|---|---|---|
| 4,545,011 A | 10/1985 | Lyon et al. | 364/200 |
| 5,276,789 A | 1/1994 | Besaw et al. | 395/140 |
| 5,504,921 A * | 4/1996 | Dev et al. | 709/223 |
| 5,619,655 A | 4/1997 | Weng et al. | 395/200.11 |
| 5,737,319 A | 4/1998 | Croslin et al. | 395/200 |
| 5,857,102 A * | 1/1999 | McChesney et al. | 713/100 |
| 6,018,625 A * | 1/2000 | Hayball et al. | 709/315 |
| 6,032,202 A * | 2/2000 | Lea et al. | 710/3 |
| 6,226,788 B1 * | 5/2001 | Schoening et al. | 709/203 |
| 6,446,142 B1 * | 9/2002 | Shima et al. | 709/331 |

FOREIGN PATENT DOCUMENTS

| | | | |
|---|---|---|---|
| EP | 0 529 787 A2 | 3/1993 | H04L/12/24 |
| EP | 0 621 706 A2 | 10/1994 | H04L/12/24 |
| EP | 0 695 100 A2 | 1/1996 | H04Q/3/00 |
| EP | 0 715 435 A2 | 6/1996 | H04L/12/24 |

OTHER PUBLICATIONS

Gamma, E. et al. "Design Patterns: Elements of Reusable Object–Oriented Software" 1995 Addison–Wesley, pp. 81–116.*
McCloghrie, K. et al. "RFC 1213" 1991 Internet Engineering Task Force.*
Case, J. et al. "RFC 1157" 1990 Internet Engineering Task Force.*
Warrier, U. et al. "RFC 1189" 1990 Internet Engineering Task Force.*

* cited by examiner

Primary Examiner—Zarni Maung
(74) Attorney, Agent, or Firm—McDonnell Boehnen Hulbert & Berghoff

(57) ABSTRACT

In a network supervising apparatus a program suitable for interrogating, in a network, a selected device of a large number of possible devices in respect of at least one functionality of the device (e.g. topology or sizing) comprising:

a plurality of directories of elements, each element comprising a module of program code, each directory having a plurality of elements;

selecting from at least one directory those elements which relate to the selected device and the desired functionality; and utilizing the selected elements to interrogate the selected device.

51 Claims, 2 Drawing Sheets

PROGRAM METHOD AND APPARATUS PROVIDING ELEMENTS FOR INTERROGATING DEVICES IN A NETWORK

BACKGROUND OF THE INVENTION

The present invention relates to supervising a network, that is a network of electronic devices comprising, for example, workstations, personal computers, servers, hubs, routers, bridges, switches, (hereinafter referred to as devices of the network), and links between these devices which may be in the form of physical cable or wireless links. The network may be a local area network (LAN), wide area network (WAN) or other types and may operate in accordance with any desired protocol.

After such a network has been installed, it is desirable for the person appointed network manager to be able to understand the technical operation of the network. In known network management systems, the manner in which the relevant data is retrieved from the managed devices, compiled and displayed has been problematic in several respects. Firstly, the data received from each of the managed devices is simply compiled and displayed as a list of data for the user to interpret. Secondly, the data does not provide information about unmanaged devices. Thirdly, information about a given network device, such as the type of device, location of the device on the network and operating speed of the device, may be contained in different sections of the compiled data. Consequently, conventional systems are cumbersome and difficult to use.

In co-pending UK patent applications numbers, 9910843.3, 9910961.3, 9910844.1, 9910845.8, 9910838.3, 9910837.5, 9910839.1, 9910840.9, 9913531.1 (each in the name of the assignee of the present application) which are incorporated herein, we describe various arrangements for providing automatic interrogation of the network to thereby produce a network map which may be displayed on a visual display unit showing the devices and links between the devices. At its simplest, and where the device is a "managed" device, this is usually provided by interrogation using a known protocol, such as the SNMP protocol, of the so-called 'agent' of each device which stores the devices unique MAC address, the type of device and the MAC addresses of the devices which are connected to the ports directly or indirectly.

The interrogation of the agent in each device is carried out under the control of a computer program controlled by the network manager's computer. There are a large number of devices of different general types, for example, workstations, personal computers, servers, hubs, routers, bridges, switches, as well as different subtypes within each type, and also there are different manufacturers of these devices. Thus the agents which the program may be-called upon to interrogate may be one of a very large number of different types of agent which need to be interrogated in different ways.

Furthermore, as the technology is evolving rapidly, new devices, new subgroups of devices, new manufacturers and new models of each device are continuously being introduced to the marketplace.

Whereas it is possible to write a program to deal with all types of agents which the interrogation may encounter at the present time, as new models are introduced the program will rapidly get out of date. It is undesirable to have to rewrite the complete program every few months to deal with new devices.

The invention deals with this problem.

SUMMARY OF THE INVENTION

The present invention relates to a program method and apparatus providing elements for interrogating devices in a network.

The present invention provides a method of generating a program suitable for interrogating a selected device in a network in respect of at least one functionality of the device comprising:

providing a plurality of directories of elements, each element comprising a module of program code, each directory having a plurality of elements;

selecting from at least one directory those elements which relate to the selected device and the desired functionality; and utilising the selected elements to interrogate the selected device.

The present invention also provides network supervising apparatus comprising processor apparatus:

said network supervising apparatus including a plurality of directories of elements, each element comprising a module of program code, each directory having a plurality of elements;

said processor apparatus, in use, selecting from at least one directory those elements which relate to the selected device and the desired functionality to provide a program suitable for interrogating a selected device in a network in respect of at least one functionality of the device.

The present invention also provides a computer program on a computer readable medium or embodied in a carrier wave for use in interrogating a selected device in a network in respect of at least one functionality of the device, said program comprising:

a plurality of directories of elements, each element comprising a module of program code, each directory having a plurality of elements;

program means for selecting from at least one directory those elements which relate to the selected device and the desired functionality; and program means for utilising the selected elements to interrogate the selected device.

BRIEF DESCRIPTION OF THE DRAWINGS

A preferred embodiment of the invention will now be described by way of example only and with reference to the accompanying drawings in which.

DESCRIPTION OF THE PREFERRED EMBODIMENTS

Figure 1:
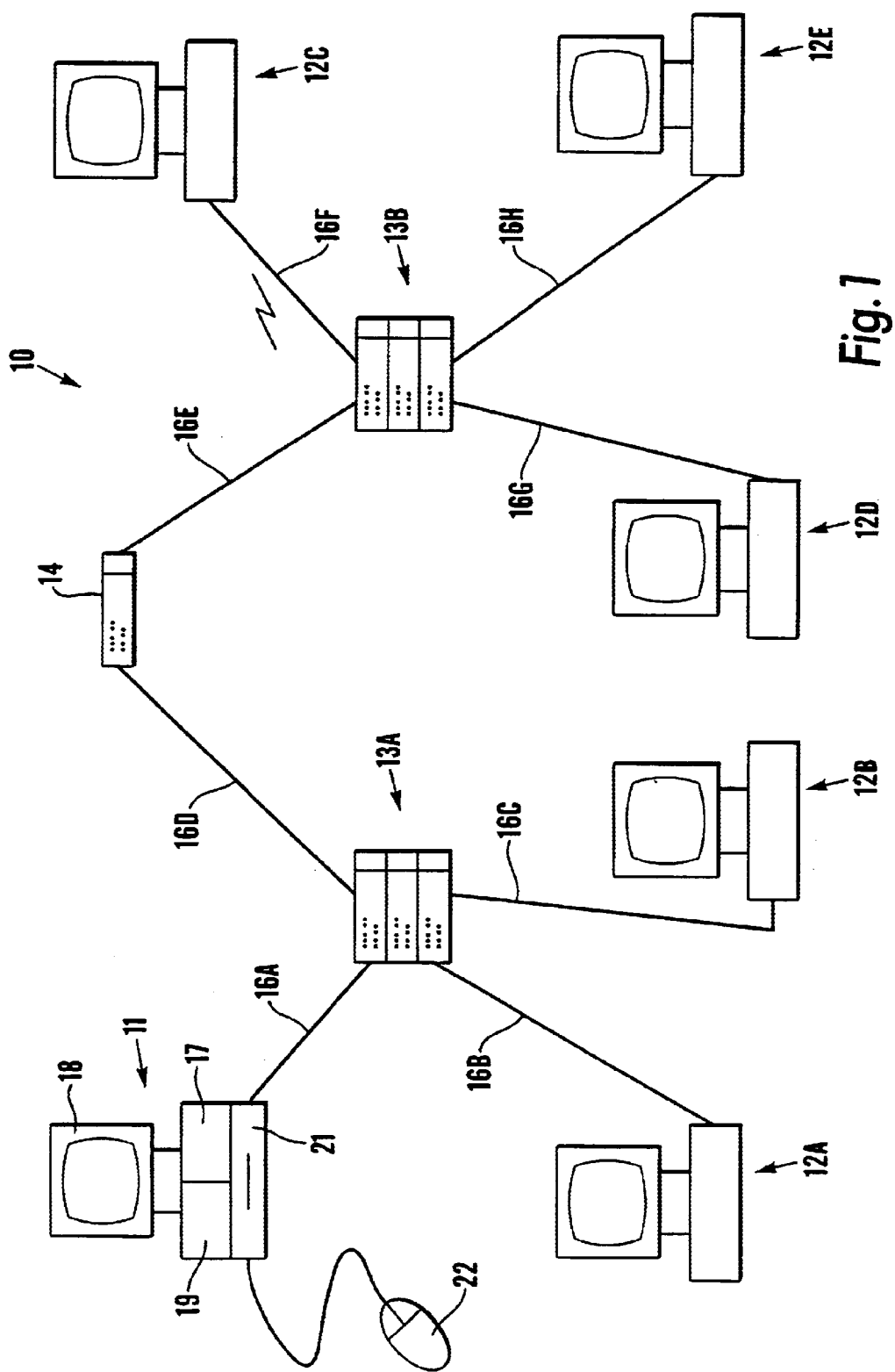
FIG. 1 is a diagrammatic view of a network incorporating a preferred embodiment of the invention.

Referring to FIG. 1 there is shown a network 10 comprising a plurality of devices in the form of a network supervisor's workstation or computer 11, other workstations 12B–E, hubs 13A, 13B, and switch 14. The network is a simple network and is set out for purposes of illustration only. Other configurations and arrangements, may be used.

The devices are connected together by means of links 16A–H which may be hard wired and utilise any desired protocol, and link 16F which is a wireless link.

The network supervisor's workstation includes, in addition to a visual display unit 18, a central processing unit or signal processor 19, a selector which may be in the form of a mouse 22, a program store 21 which may comprise, for example, a CD drive, a floppy disk drive or a zip drive, and a memory 17 for storing a program which may have been loaded from the program store 21 or downloaded for example via Internet from a website.

By means which is disclosed in the co-pending patent applications referred to above, the network supervisor's computer 11 may interrogate and analyse the network, and store in the memory 17 the information relating to the devices within the network and the links between the devices. In essence, most quality devices include a so-called agent which stores information about the device such as its unique MAC number, an identifier which identifies what the device is and what model type it is, how many ports it has and how they are connected, and the address to which at least some of the ports are connected. Under control of a program, the computer 11 interrogates the agents of each device.

The computer 11 may, on command from the selector 22, process signals from the memory 17 by the signal processor 19 and provide on the visual display unit 18 a network map showing each of the devices and the links therebetween.

As indicated above, the hardware devices to which the present invention applies are becoming increasingly complex and are continuously changing and so a computer program which will enable one to interrogate successfully all known types of agent at the present time rapidly becomes out of date.

In essence, the computer program according to a preferred embodiment of the invention is designed to provide from a library a set of elements (each element is a module of code), for a given device (node), each set of elements being referred to as a "node model object". One element of the set is arranged to interrogate and obtain from the agent relevant information in respect of, for example, topology, another sizing (how many ports the device has, how many units are provided in the device when they are stacked), and another the overall health of the device (ie a measure of how close to saturation the device is).

To consider for a moment the element which relates to topology, there may be provided a number of different elements in a directory (an aggregate directory or a default directory, which will be explained later) which deal with topology, each topology element being suitable for handling different types of device.

When the computer program is to be used to interrogate a network, initially the program causes the system to interrogate each element to find out what functionality it has (ie what features it deals with, such as topology). The program then causes the system to access the relevant device and from the device's identity it determines which elements of the program are required to carry out the necessary interrogation. It then loads the relevant elements to create the "node model object" which is a sub-program with relevant elements which can carry out the interrogation desired.

In particular questions regarding topology will be passed to the device via the chosen element relating to topology and questions relating to sizing will be passed to the device via the chosen element relating to sizing.

Figure 2:
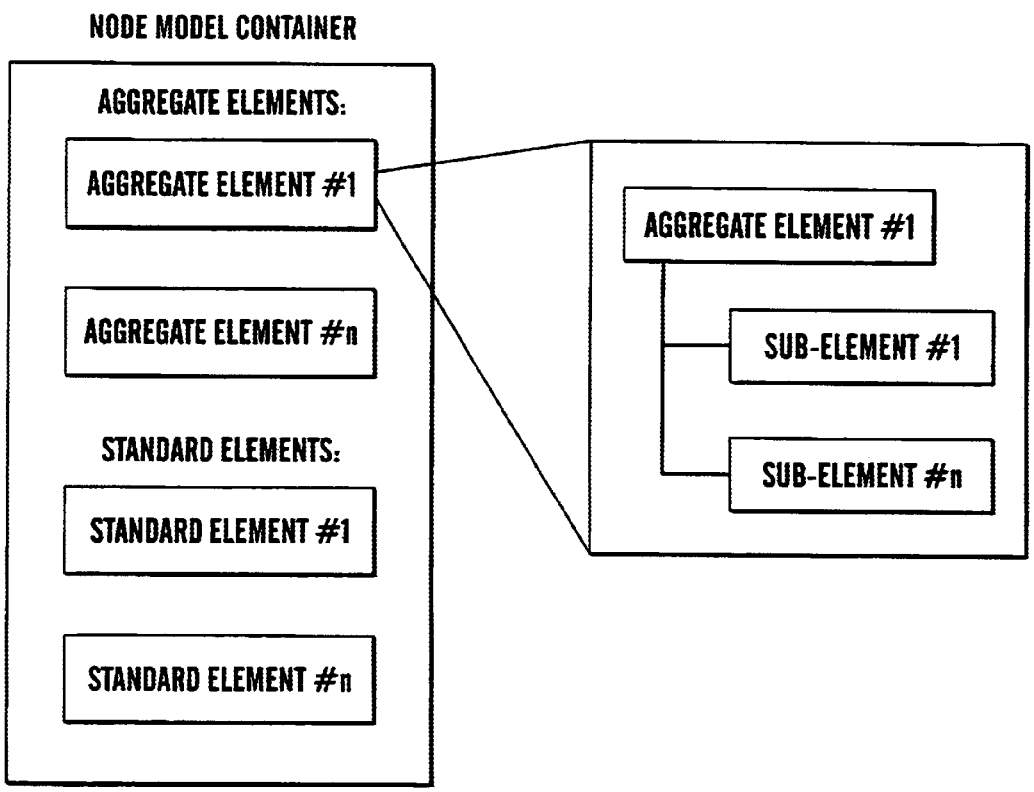
FIG. 2 shows a node model structure.

Individual network devices are represented by 'Node Model' objects (see FIG. 2). Each Node Model object is a container that holds one or more 'elements' or blocks of code. Each element implements a specific interface related to a particular device capability. Examples of capabilities include:

Topology: This element or block uses information from the device to answer topology-related questions, such as 'which MAC addresses have been seen on a given port'.

Sizing: This element or block provides information about the logical and physical structure of a device, e.g. how many units and ports.

The advantage of this arrangement is that the program is modular in character, individual elements being loaded to provide the necessary function, and this means that over the course of time, as designs of devices change, it is only necessary to add further elements rather than rewrite the complete program. Furthermore, as a new device is introduced, it may be that not all of the elements will need to be rewritten to deal with that particular device but only some of the elements.

Furthermore, the arrangement includes the feature that if the device identifier relates to a device which is not supported in detail by the particular program, generic or standard, elements relating to individual functionality, for example topology, can operate at a lower level and provide a basic interrogation ability.

Furthermore, because of the modular nature of the program, if there are any bugs or problems, then it will normally be that only one module needs to be fixed.

Node model objects are created by means of a generic framework that uses socalled 'factory' objects to determine which elements should be loaded for a given device.

Initially, the framework will load into a node model object two sets of elements: 'Default' elements & 'aggregate' elements. This is done by going to pre-defined directories (one for defaults, one for aggregates), and dynamically loading up all of the element objects found. The exact function of these types of elements is described later.

The framework then interrogates the device for a basic piece of information, the sysObjectID which identifies the device in question. This allows it to determine which factory object should be loaded. (Note however that it is possible for a developer to specify which factory object should be used by means of changing a system configuration file. In this way, it will be possible to add new factory objects in the future.) It is the factory object that then determines which elements of a third set of elements, (the device specific elements) should be loaded.

Typically, it will then obtain extra information from the device, for example the sysDescr of the device, and keys this against another configuration file to determine the name of a directory containing the device specific element objects. Note that these configuration files are text-based, which allows the behaviour of the framework to be modified simply by editing text files, rather than by changing code, which then reduces the need for regression testing when new elements or factory objects are added.

Once a device specific directory has been found, the framework dynamically loads up all of the element objects in it, and dynamically interrogates them to determine what interfaces they support. It will also look for a file specifying if element objects from other directories should be loaded up. In this way, common element objects can be shared across different devices. At this point, the system will have determined all of the interfaces implemented by the various element objects for this device.

However, the framework also supports the idea of 'default' elements: it has a list of 'default' elements that was created during the first step in the loading sequence, and it now determines which interfaces they support. It then compares this list of interfaces with the list of those loaded for the device, and will determine which interfaces have not been provided for the device. It will then attach the elements implementing these 'missing' interfaces to the node model for the device. In this way, it is possible to provide 'fallback' elements, so that the system can guarantee a minimum level of support for a particular capability for all devices. For example, it is possible to provide default elements that provide support for non-3Com devices that support standard MIBs.

Once any remaining default element objects have been added to the node model container, the list of 'standard' elements will then be complete.

Finally, the framework supports the idea of 'aggregate' elements. These are elements that interrogate 'sub-elements', and aggregate the results to provide a node model, for example, for a stack of devices which may or may not be of the same type. This then allows elements to be provided at the individual unit level (e.g.: port, blade), rather than the device level, which is useful for more advanced devices where behaviour related to a particular capability can vary across individual units/chassis blades in the device.

In order to create the list of sub-elements for each aggregate element, the node model container object iterates through list of interfaces supported by aggregate elements, and for each one, finds elements that also implement that interface in the 'standard' element list. References to these are then added to the aggregate element, thereby causing the aggregate element's list of subelements to be populated.

When a user of a Node Model object wishes to obtain information from a given interface, it makes a request to the Node Model container object that specifies the textual name of the interface required. The container then attempts to obtain the corresponding interface as follows:

1. It first searches through the list of aggregate elements to determine if an interface of this name is present, and returns a reference to it if one is found.
2. Only if a matching aggregate element is not found, does the container search the list of 'standard' elements.

In this way, the container ensures that if an aggregate element is present e.g.: a stack or devices are present, all requests will go through this aggregate element, rather than the individual elements that it uses.

Once the node model has been set up for the relevant device or stack of devices, it or they may be interrogated to provide the information received by, for example, the systems disclosed in our copending patent applications.

Advantages of the described arrangement include:
1) When support for a new device or bug fixes become available, it is possible to add new code to the system without having to recompile any of the 'core' framework code. This reduces the amount of regression testing that needs to be performed, since only the new code will need to be tested.
2) The framework is able to interrogate new code modules 'on the fly' so as to determine which capabilities they support.
3) It is possible to share code (elements) for supporting similar devices without having to duplicate it for each device.
4) The framework is capable of using default code elements to provide support for devices for which specific code has not been provided (e.g. devices from other manufacturers).
5) The use of element objects allows devices to be represented in a highly granular fashion, so that it is easy to add new elements as new capabilities come along, as well as ensuring that devices are not represented using one monolithic piece of code. It is also possible to change the implementation of a particular element without affecting any other elements, thus making it possible to 'patch' existing systems, and also making general maintenance easier.

A more detailed description of the node model loading sequence follows. The program creates the necessary software for a device as follows:

1. Load into node model object all available 'Default' Elements objects from defaults directory.
2. Load into node model object all available Aggregate Elements from aggregates directory, and add to Node Model (note: will not reference sub-elements at this point).
3. Interrogate Device for sysObjectID.
4. Determine & load factory object using results of 3, and textual config file.
5. Factory object obtains any extra information from device, and uses results to determine loading directory of device specific elements using textual config file.
6. Factory object loads up all device specific element objects present in loading directory, and adds them to the Node Model.
7. Factory object looks for text file specifying other element objects to be loaded. It will then load up each element object specified, and adds it to the Node Model.
8. Factory object determines which interfaces supported by the default elements have not been provided by the device-specific elements loaded. It then adds the corresponding default elements to the Node Model. This list of device-specific & default elements in the Node Model is known as the 'standard' element list.
9. Container finds 'standard' elements implementing interfaces supported by aggregate elements, and adds references to them to the sub-element list of the relevant aggregate element.

We have described a completely generic framework for representing network devices, which uses modular elements of code to not only implement functionality related to a particular capability, but to also determine how to load up element objects. As a result, it is possible to add support for new devices, and for arbitrary new device capabilities, without having to change the framework itself. This greatly reduces the time required to support new devices/new capabilities.

The use of textual configuration files to control the behaviour of the framework's loading mechanism, together with the dynamic loading of element objects, makes it very easy to 'patch' existing systems. Since only new or modified element objects need to be added, it greatly reduces the regression testing required, since older elements and the framework code are not affected. The framework also allows code to be shared across devices with similar capabilities, thus removing duplication of code and effort.

The use of 'default' elements also allows the application to provide a minimum level of support for a capability for all devices.

We have described how the network may be supervised. The method of the invention may be carried out under the control of the network supervisor's workstation or computer and in particular by means of a program controlling the processor apparatus of that computer or elsewhere in the system.

The program for controlling the operation of the invention may be provided on a computer readable medium, such as a CD, or a floppy disk, or a zip drive disk carrying the program or their equivalent, or may be provided on a computer or computer memory carrying the website of, for example, the supplier of the network products. The program may be downloaded from whichever appropriate source via, for example, a telephone line, a wireless radio or an infra-red link, in each of which cases it may be embodied in a carrier wave and used to control the processor to carry out the steps of the invention as described.

What is claimed is:

1. A method of generating a program suitable for interrogating a selected device in a network in respect of at least one functionality of the device comprising:

providing a plurality of sets of elements in at least one directory, each element comprising a module of program code, each directory having a plurality of elements;

interrogating the selected device to establish its type, wherein establishing the type of the selected device includes obtaining an identifier for the device and wherein an identifier for a new or updated device is added to a reference file at any time permitting real-time addition of new or updated devices;

using the type of the selected device to select from the at least one directory those elements which relate to the type of the selected device and the functionality it provides;

utilising the selected elements to interrogate the selected device;

each element implementing a specific interface related to a particular device capability, whereby to avoid rewriting of said program on modification of said device capability.

2. A method as claimed in claim 1 in which there are at least two sets of elements, one set of which includes device-specific elements which provide detailed interrogation and a second set of which includes default non-device specific elements which provide a basic level of interrogation, the method including the step of selecting elements from the second set of elements if the relevant equivalent element which is suitable for the selected device is not found in the first set of elements.

3. A method as claimed in claim 2 in which there is also provided another set of elements comprising a set of aggregate elements.

4. A method as claimed in claim 3 in which the aggregate elements interrogate the device via the relevant default and/or device specific elements.

5. A method as claimed in claim 3 in which the following steps are provided:

loading all of the default and the aggregate elements, interrogating the device to ascertain its type, loading a factory object relating to the device identified in the preceding step, using this factory object to determine whether device specific elements for the device type identified exist, and if so to load them to a node model, using this factory object to determine which interfaces supported by the default elements have not been provided by the device-specific elements loaded, and adding the corresponding default elements to the node model, and using this factory object to determine which default and/or device specific elements that have been added to the node model have associated aggregate elements, adding the corresponding aggregate elements to the node model, and subsequently associating these aggregate elements with the appropriate default and/or device specific elements.

6. A method as claimed in claim 3 for use where the selected device contains several units that implement a feature in different ways, said method including the step of the aggregate elements aggregating the results from one or more default and/or device specific elements, which aggregate element may be used with the selected device which contains several units that implement a feature in different ways.

7. A method as claimed in claim 3, wherein all requests will go through the aggregate element in preference to elements representing individual units of a stack of devices.

8. A method as claimed in claim 7 wherein different elements are loaded for different units in a stack.

9. A method as claimed in claim 3, wherein all requests will go through the aggregate element prior to elements representing individual units of a stack of devices.

10. A method as claimed in claim 9 wherein different elements are loaded for different units in a stack.

11. A method as claimed in claim 1 in which functionality includes topology and sizing, and the selection step of the method includes selecting elements relating to topology and selecting elements relating to sizing.

12. A method as claimed in claim 1 in which each set of elements is provided in a respective separate directory.

13. A method as claimed in claim 1 wherein an identifier for the device is a sysObjectID for the device and a reference file is a system configuration file.

14. Network supervising apparatus comprising processor apparatus:

said network supervising apparatus including a plurality of sets of elements in at least one directory, each element comprising a module of program code, each directory having a plurality of elements;

said processor apparatus, in use, interrogating a selected device to establish its type wherein establishing the type of the selected device includes obtaining an identifier for the device and wherein an identifier for a new or updated device is added to a reference file at any time permitting real-time addition of new or updated devices, and using the type of the selected device to select from at least one directory those elements which relate to the type of the selected device and the desired functionality to provide a program suitable for interrogating the selected device in a network in respect of at least one functionality of the selected device, each element implementing a specific interface related to a particular device capability, whereby to avoid rewriting of said program on modification of said device capability.

15. Network supervising apparatus as claimed in claim 14 in which there are at least two sets of elements one set of which includes device specific elements, which provide detailed interrogation and a second set of which includes default non-device specific elements which provide a basic level of interrogation, the processor apparatus selecting elements from the second set of elements if the relevant equivalent element which is suitable for the selected device is not found in the first set of elements.

16. Network supervising apparatus as claimed in claim 15 in which there is also provided another set of elements comprising a set of aggregate elements.

17. Network supervising apparatus as claimed in claim 16 in which the network supervising apparatus uses the aggregate elements to interrogate the device via the relevant default and/or device specific elements.

18. Network supervising apparatus as claimed in claim 17 for use where the selected device contains several units that implement a feature in different ways, wherein said aggregate elements are adapted to aggregate the results from one or more default and/or device specific elements, whereby the aggregate element may be used with the selected device which contains several units that implement a feature in different ways.

19. A network supervising apparatus as claimed in claim 16, wherein all requests will go through the aggregate element in preference to elements representing individual units of a stack of devices.

20. A network supervising apparatus as claimed in claim 19 wherein different elements are loaded for different units in a stack.

21. A network supervising apparatus as claimed in claim 16, wherein all requests will go through the aggregate element prior to elements representing individual units of a stack of devices.

22. A network supervising apparatus as claimed in claim 21 wherein different elements are loaded for different units in a stack.

23. Network supervising apparatus as claimed in claim 14 in which each set of elements is provided in a respective separate directory.

24. Network supervising apparatus as claimed in claim 14 in which functionality includes topology and sizing, and said processor apparatus selects elements relating to topology and selects elements relating to sizing.

25. Network supervising apparatus as claimed in claim 14 including a store to store the results of the interrogation of the devices in the network by the program.

26. Network supervising apparatus as claimed in claim 25 including a visual display apparatus connected to said store to connect the information in the store into a visual display on the visual display unit of information relating to said devices.

27. A network supervising apparatus as claimed in claim 14 wherein an identifier for the device is a sysObjectID for the device and a reference file is a system configuration file.

28. A computer program on a computer readable medium for use in interrogating a selected device in a network in respect of at least one functionality of the device, said program comprising:
    a plurality of directories of elements, each element comprising a module of program code, each directory having a plurality of elements;
    program means for interrogating the selected device to establish its type wherein establishing the type of the selected device includes obtaining an identifier for the device and wherein an identifier for a new or updated device is added to a reference file at any time permitting real-time addition of new or updated devices, and using the type of the selected device to select from at least one directory those elements which relate to the type of the selected device and the desired functionality; and
    program means for utilising the selected elements to interrogate the selected device,
    each element implementing a specific interface related to a particular device capability,
    whereby to avoid rewriting of said program on modification of said device capability.

29. A computer program as claimed in claim 28 in which there are at least two directories, one of which includes device specific elements which provide detailed interrogation and a second one of which includes default non-device specific elements which provide a basic level of interrogation, the program including the step of selecting elements from the second directory if the relevant equivalent element which is suitable for the selected device is not found in the first directory.

30. A computer program as claimed in claim 29 including a third directory including a set of aggregate elements.

31. A computer program as claimed in claim 30 including program means to cause the selected aggregate elements to interrogate the device via the relevant default and/or device specific.

32. A computer program as claimed in claim 30, wherein all requests will go through the aggregate element in preference to elements representing individual units of a stack of devices.

33. A computer program as claimed in claim 32 wherein different elements are loaded for different units in a stack.

34. A computer program as claimed in claim 30, wherein all requests will go through the aggregate element prior to elements representing individual units of a stack of devices.

35. A computer program as claimed in claim 34 wherein different elements are loaded for different units in a stack.

36. A computer program as claimed in claim 28 in which functionality includes topology and sizing, and the program means for selecting includes program means for selecting elements relating to topology and selecting elements relating to sizing.

37. A computer program as claimed in claim 28 including:
    program means for loading elements from a first directory,
    program means for loading elements from a second directory,
    program means for interrogating the device to ascertain its type,
    program means for loading a factory object relating to the type of device identified in the preceding step, and,
    program means for using this factory object to determine a loading directory including device specific elements from a device specific directory.

38. A computer program as claimed in claim 37 including:
    program means for using the factory object to load all of the device specific elements of the loading directory,
    program means for using the factory object to determine which interfaces supported by the first elements have not been provided by the device-specific elements loaded, and
    program means for loading the corresponding first elements.

39. A computer program as claimed in claim 28 wherein an identifier for the device is a sysObjectID for the device and a reference file is a system configuration file.

40. A computer program embodied in a carrier wave for use in interrogating a selected device in a network in respect of at least one functionality of the device, said program comprising:
    a plurality of directories of elements, each element comprising a module of program code, each directory having a plurality of elements;
    program means for interrogating the selected device to establish its type wherein establishing the type of the selected device includes obtaining an identifier for the device and wherein an identifier for a new or updated device is added to a reference file at any time permitting real-time addition of new or updated devices, and using the type of the selected device to select from at least one directory those elements which relate to the type of the selected device and the desired functionality; and program means for utilising the selected elements to interrogate the selected device, each element implementing a specific interface related to a particular device capability, whereby to avoid rewriting of said program on modification of said device capability.

41. A computer program as claimed in claim 40 in which there are at least two directories, one of which includes device-specific elements which provide detailed interrogation and a second one of which includes default non-device specific elements which provide a basic level of interrogation, the program including the step of selecting elements from the second directory if the relevant equivalent element which is suitable for the selected device is not found in the first directory.

42. A computer program as claimed in claim 41 which there is also provided another set of elements comprising a set of aggregate elements.

43. A computer program as claimed in claim 42, wherein all requests will go through the aggregate element in preference to elements representing individual units of a stack of devices.

44. A computer program as claimed in claim 43 wherein different elements are loaded for different units in a stack.

45. A computer program as claimed in claim 42, wherein all requests will go through the aggregate element prior to elements representing individual units of a stack of devices.

46. A computer program as claimed in claim 45 wherein different elements are loaded for different units in a stack.

47. A computer program as claimed in claim 42 including program means to cause the selected aggregate elements to interrogate the device via the relevant default and/or device specific elements.

48. A computer program as claimed in claim 40 in which functionality includes topology and sizing, and the program means for selecting includes program means for selecting elements relating to topology and selecting elements relating to sizing.

49. A computer program as claimed in claim 40 including:

program means for loading elements from a first directory, program means for loading elements from a second directory, program means for interrogating the device to ascertain its type, program means for loading a factory object relating to the type of device identified in the preceding step, and, program means for using this factory object to determine a loading directory including device specific elements from a device specific directory.

50. A computer program as claimed in claim 49 including:

program means for using the factory object to load all of the device specific elements of the loading directory, program means for using the factory object to determine which interfaces supported by the first elements have not been provided by the device-specific elements loaded, and program means for loading the corresponding first elements.

51. A computer program as claimed in claim 40 wherein an identifier for the device is a sysObjectID for the device and a reference file is a system configuration file.

* * * * *